(12) United States Patent
Angelov et al.

(10) Patent No.: US 11,949,339 B2
(45) Date of Patent: Apr. 2, 2024

(54) ELECTRONIC CIRCUIT ARRANGEMENT FOR A FUEL CELL ARRANGEMENT AND FUEL CELL ARRANGEMENT

(71) Applicant: Mahle International GmbH, Stuttgart (DE)

(72) Inventors: Tihomir Angelov, Ludwigsburg (DE); Volker Kirschner, Muehlacker (DE); Hans C. Uibeleisen, Stuttgart (DE)

(73) Assignee: Mahle International GmbH (DE)

( * ) Notice: Subject to any disclaimer, the term of this patent is extended or adjusted under 35 U.S.C. 154(b) by 233 days.

(21) Appl. No.: 17/672,084

(22) Filed: Feb. 15, 2022

(65) Prior Publication Data

US 2022/0263420 A1 Aug. 18, 2022

(30) Foreign Application Priority Data

Feb. 15, 2021 (DE) ...................... 10 2021 201 400.3

(51) Int. Cl.
*H02M 7/5387* (2007.01)
*H01M 8/04858* (2016.01)
(Continued)

(52) U.S. Cl.
CPC ... *H02M 3/33573* (2021.05); *H01M 8/04873* (2013.01); *H01M 8/04888* (2013.01); *H02M 3/3376* (2013.01); *H01M 2220/20* (2013.01)

(58) Field of Classification Search
CPC .......................... H02M 3/33573; H02M 3/3376
See application file for complete search history.

(56) References Cited

U.S. PATENT DOCUMENTS 10,367,363 B2   7/2019  Tritschler et al.
2003/0002304 A1*  1/2003  Zhu .................... H02M 1/34
                                                      363/56.02

(Continued)

FOREIGN PATENT DOCUMENTS

DE   102005021722 A1   5/2006
DE   102011079214 A1   1/2013
(Continued)

OTHER PUBLICATIONS

English abstract for DE-102005021722.
(Continued)

*Primary Examiner* — Jared Fureman
*Assistant Examiner* — Esayas G Yeshaw
(74) *Attorney, Agent, or Firm* — Fishman Stewart PLLC

(57) ABSTRACT

An electronic circuit arrangement for a fuel cell arrangement may include a first electrical voltage converter stage and a second electrical voltage converter stage. An electrical fuel cell voltage may be appliable to the first electrical voltage converter stage on an input side. The electrical fuel cell voltage may be convertible into a first electrical output voltage of the first electrical voltage converter stage via the first electrical voltage converter stage. The first electrical output voltage may be appliable to the second electrical voltage converter stage on an input side. The first electrical output voltage may be convertible into a second electrical output voltage of the second electrical voltage converter stage via the second electrical voltage converter stage. An electrical interconnection of the first electrical voltage converter stage and the second electrical voltage converter stage may be switchable between a first interconnection state and a second interconnection state.

20 Claims, 6 Drawing Sheets

(51) Int. Cl.
 *H02M 3/335* (2006.01)
 *H02M 3/337* (2006.01)

(56) References Cited

U.S. PATENT DOCUMENTS

| | | | |
|---|---|---|---|
| 2004/0037092 | A1 | 2/2004 | Kurio et al. |
| 2007/0081368 | A1* | 4/2007 | Wai .................. H02M 1/34 |
| | | | 363/98 |
| 2009/0196082 | A1* | 8/2009 | Mazumder ......... H02M 7/5387 |
| | | | 363/132 |
| 2013/0028000 | A1* | 1/2013 | Mueller .................. H02J 3/381 |
| | | | 363/132 |
| 2014/0302415 | A1 | 10/2014 | Peter |
| 2016/0218656 | A1* | 7/2016 | Hawliczek ............... H02P 27/06 |
| 2021/0249898 | A1* | 8/2021 | Schecter ................. H02J 9/062 |
| 2021/0376743 | A1 | 12/2021 | Breu et al. |
| 2022/0103003 | A1* | 3/2022 | Sahoo ....................... H02J 1/02 |

FOREIGN PATENT DOCUMENTS

| | | | |
|---|---|---|---|
| DE | 102013007056 | A1 | 10/2014 |
| DE | 102014217703 | A1 | 3/2016 |
| DE | 102014018744 | A1 | 6/2016 |
| DE | 102017008841 | A1 | 3/2019 |
| DE | 102018218091 | A1 | 4/2020 |
| WO | WO-2010/071855 | A2 | 6/2010 |

OTHER PUBLICATIONS

English abstract for DE-102011079214.
English abstract for DE-102013007056.
English abstract for DE-102014018744.
English abstract for DE-102017008841.
German Search Report for DE-102021201400.3, dated Sep. 2, 2021.

* cited by examiner

ELECTRONIC CIRCUIT ARRANGEMENT FOR A FUEL CELL ARRANGEMENT AND FUEL CELL ARRANGEMENT

CROSS-REFERENCE TO RELATED APPLICATIONS

This application claims priority to German Patent Application No. DE 10 2021 201 400.3, filed on Feb. 15, 2021, the contents of which is hereby incorporated by reference in its entirety.

TECHNICAL FIELD

The invention relates to an electronic circuit arrangement for a fuel cell arrangement and a fuel cell arrangement with such an electronic circuit arrangement.

BACKGROUND

Since fuel cells have to be brought up to operating temperature on start-up—i.e. when the fuel cell is switched on to generate an electrical fuel cell voltage—at a low ambient temperature—typically below the freezing point of water—, fuel cells are initially operated at low ambient temperatures in a special operating mode, the so-called "freeze start mode". In this freeze start mode, the fuel cell is typically operated in a targeted manner at an operating point with low efficiency and a correspondingly large waste heat. This waste heat is in turn used to heat up the fuel cell. In the freeze start mode, the fuel cell voltage generated by the fuel cell is typically lowered to approximately 0.1 volts per individual cell of the fuel cell. In contrast, the electrical fuel cell voltage generated by the fuel cell is higher when the fuel cell is in normal operation and is generally around 0.6 volts per individual cell. Electrical loads, which are supplied with electrical energy generated by the fuel cell, usually require a constant electrical voltage level even in the freeze start mode.

For this reason, electric DC voltage converters are conventionally used, by means of which the fuel cell voltage, which is reduced in the freeze start mode of the fuel cell and is present as DC voltage, can be increased to the required electric voltage. However, it is necessary that in the normal operating state of the fuel cell, in which the fuel cell voltage is increased compared to the freeze start mode, the electrical voltage applied to the electrical loads is also at the constant required voltage level.

SUMMARY

It is therefore an object of the present invention—particularly with regard to the problems outlined above—to provide new possible electronic circuit arrangements for fuel cell arrangements and for a fuel cell arrangement with such an electronic circuit arrangement.

This object is achieved by the electronic circuit arrangement and/or by the fuel cell arrangement according to the independent claim(s). Preferred embodiments are the subject matter of the dependent claim(s).

The basic idea of the invention is accordingly to provide an electronic circuit arrangement for a fuel cell arrangement with two voltage converter stages, i.e. with a first voltage converter stage and with a second voltage converter stage, which are switchably electrically connected to one another.

Such an electronic circuit arrangement advantageously allows a transformation ratio of a voltage conversion that can be effected by means of the electronic circuit arrangement to be carried out particularly easily by switching over the electrical connection of the first to the second electrical voltage converter stage, so that on the one hand it can be ensured that a reduced voltage value of the electrical fuel cell voltage, when the fuel cell is in the freeze start mode, can be raised to the voltage level required by the electrical load. On the other hand, the voltage level required by the load is also maintained and not exceeded during normal operation of the fuel cell.

An electronic circuit arrangement according to the invention for a fuel cell arrangement, in particular for a motor vehicle, includes a first electrical voltage converter stage. An electrical fuel cell voltage is or can be applied to this first electrical voltage converter stage of the electronic circuit arrangement on the input side. In this case, the electrical fuel cell voltage can be converted into a first electrical output voltage of the first electrical voltage converter stage by means of the first electrical voltage converter stage. Furthermore, the electronic circuit arrangement includes a second electrical voltage converter stage, which is electrically connected to the first electrical voltage converter stage. The first electrical output voltage of the first electrical voltage converter stage is or can be applied to the second electrical voltage converter stage on the input side. In this case, the first electrical output voltage can be converted into a second electrical output voltage of the second electrical voltage converter stage by means of the second electrical voltage converter stage. The electrical interconnection of the first and the second electrical voltage converter stage can be switched between a first interconnection state and a second interconnection state of the electronic circuit arrangement. As indicated above, the desired adjustment of the transformation ratio of the voltage conversion that can be effected by means of the electronic circuit arrangement can be achieved in a particularly simple way.

According to an advantageous development of the electronic circuit arrangement, the first voltage converter stage is activated in the first interconnection state, so that the first electrical output voltage differs from the fuel cell voltage. The first electrical output voltage is expediently increased compared to the fuel cell voltage. In the second interconnection state, the first voltage converter stage is deactivated, so that the first electrical output voltage corresponds to the fuel cell voltage. This means that no electrical voltage conversion takes place in the second interconnection state by means of the first voltage converter stage. This allows a particularly simple adjustment of the transformation ratio of the voltage conversion.

According to a further advantageous development of the electronic circuit arrangement, the first electrical voltage converter stage is provided with a converter topology without galvanic isolation. Such a converter topology without galvanic isolation provides a particularly simple structure.

In a further preferred development of the electronic circuit arrangement, the first electrical voltage converter stage is designed as a step-up converter. Such a step-up converter is usually also referred to as a boost converter. An electrical voltage value of the first output voltage can be increased during the conversion by means of the step-up converter compared to an electrical voltage value of the fuel cell voltage. This allows a particularly cost-effective design of the first electrical voltage converter stage.

According to a further preferred development of the electronic circuit arrangement, in the first interconnection state, the first and the second voltage converter stage are connected in a series connection. On the other hand, in the second interconnection state, the first and the second voltage converter stage are connected in a parallel connection. This advantageously enables the transformation ratio of the voltage conversion to be adapted using voltage converter stages of same construction.

A further advantageous development of the electronic circuit arrangement provides that the first electrical voltage converter stage has two first electrical voltage inputs and two first electrical voltage outputs. The second electrical voltage converter stage has two second electrical voltage inputs and two second electrical voltage outputs. This allows a particularly simple construction of the electronic circuit arrangement.

In a further advantageous development of the electronic circuit arrangement, the first electrical voltage converter stage has a first electrical transformer with an electrical input inductance and an electrical output inductance that is galvanically isolated from the input inductance of the first transformer. The second electrical voltage converter stage comprises a second electrical transformer with an electrical input inductance and an electrical output inductance which is galvanically isolated from the input inductance of the second transformer. The electrical input inductance of the first electrical transformer is or can be electrically connected to the first electrical voltage inputs via a first switching device. The electrical output inductance of the first electrical transformer is electrically connected to the first electrical voltage outputs of the first electrical voltage converter stage via a first electrical rectifier. The electrical output inductance of the first electrical transformer is electrically connected to the first electrical voltage outputs via a first electrical rectifier. The electrical input inductance of the second electrical transformer is or can be electrically connected to the second electrical voltage inputs of the second electrical voltage converter stage via a second switching device. The electrical output inductance of the second electrical transformer is electrically connected to the second electrical voltage outputs via a second electrical rectifier. This advantageously allows a particularly robust construction of the voltage converter stages.

In a further preferred development of the electronic circuit arrangement, the electrical output inductance of the first electrical transformer is electrically connected to the electrical input inductance of the second transformer in the first interconnection state, wherein the second electrical switching device and the first rectifier are electrically bypassed. This enables the series connection of the first interconnection state to be produced in a particularly simple manner.

A further advantageous development of the electronic circuit arrangement provides that, in the first interconnection state, one of the two first voltage outputs is electrically connected to one of the two second voltage inputs. In this way, the series connection can advantageously be produced in the first interconnection state by means of very short electrical conduction paths.

In a further advantageous development of the electronic circuit arrangement, in the second interconnection state, one of the two first voltage inputs is electrically connected to one of the two second voltage inputs, respectively, and one of the two first voltage outputs is electrically connected to one of the two second voltage outputs, respectively. This allows a particularly space-saving construction of the electronic circuit arrangement.

According to a further preferred development of the electronic circuit arrangement, the first electrical voltage converter stage is provided with a converter topology with galvanic isolation. This allows a particularly robust implementation of the first electrical voltage converter stage.

According to a further advantageous development of the electronic circuit arrangement, the first electrical voltage converter stage is designed as a push-pull converter, in particular as a full-bridge forward converter. This enables the electronic circuit arrangement to be implemented in a particularly cost-effective manner.

In a further advantageous development of the electronic circuit arrangement, the second electrical voltage converter stage is designed with a converter topology with galvanic isolation. A particularly robust construction of the second electrical voltage converter stage can thus be achieved.

In a further preferred development of the electronic circuit arrangement, the second electrical voltage converter stage is designed as a push-pull converter, in particular as a full-bridge forward converter. This has an advantageous effect on the manufacturing costs of the electronic circuit arrangement.

The invention also relates to a fuel cell arrangement, in particular for a motor vehicle. The fuel cell arrangement comprises at least one fuel cell for generating an electrical fuel cell voltage, in particular by means of cold combustion. The fuel cell arrangement also includes an electronic circuit arrangement according to the invention as described above. The at least one fuel cell of the fuel cell arrangement is electrically connected to the electronic circuit arrangement in order to supply the electronic circuit arrangement with the electrical fuel cell voltage. The above-mentioned advantages of the electronic circuit arrangement according to the invention are also applied in an analogous manner to the fuel cell arrangement according to the invention provided with such an electronic circuit arrangement.

Further important features and advantages of the invention result from the dependent claims, from the drawings and from the corresponding description of the figures with reference to the drawings.

It is clear that the features mentioned above and those which are explained below can be used not only in the respective specified combination, but also in other combinations or individually, without departing from the scope of the present invention.

Preferred exemplary embodiments of the invention are illustrated in the drawings and are explained in more detail in the following description, wherein same reference numbers refer to identical or similar or functionally identical components.

BRIEF DESCRIPTION OF THE DRAWINGS

In particular, schematically.

DETAILED DESCRIPTION

Figure 1:
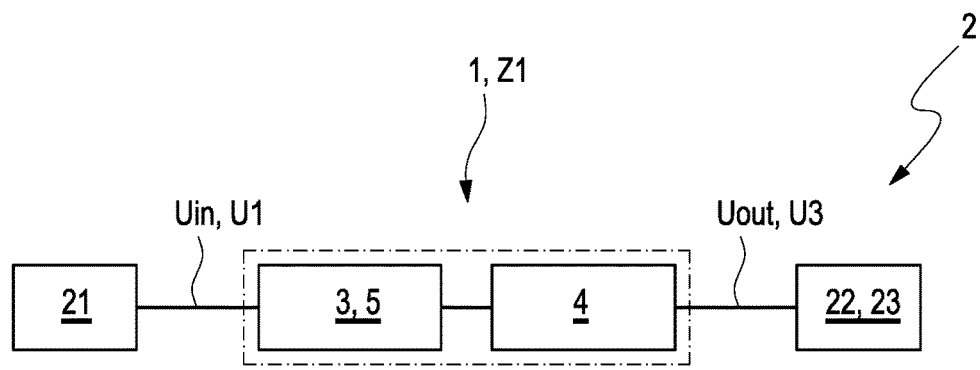
FIG. 1a shows an example of a fuel cell arrangement according to the invention with a circuit arrangement according to the invention in a block diagram.
FIG. 1b shows an example of an electrical circuit diagram of a first electrical voltage converter stage for the electronic circuit arrangement of FIG. 1a, FIG. 1c shows an example of an electrical circuit diagram of a second electrical voltage converter stage for the electronic circuit arrangement of FIG. 1a, FIG. 2a shows a further example of a fuel cell arrangement according to the invention with an exemplary electronic circuit arrangement according to the invention in a first interconnection state in a block diagram.
Figure 1:
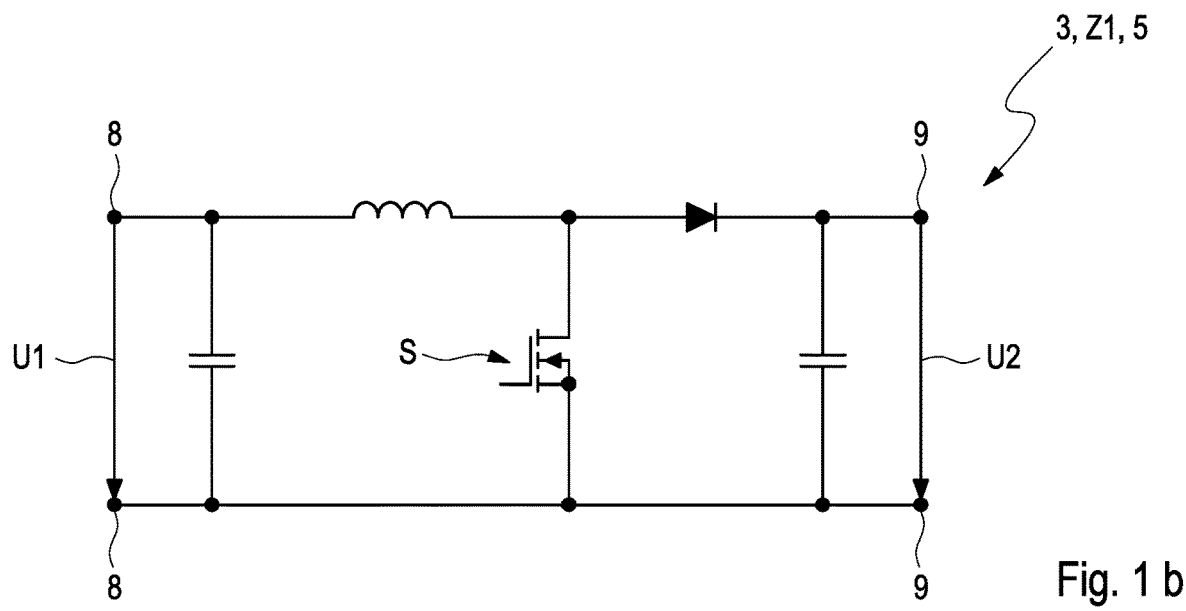
Figure 1:
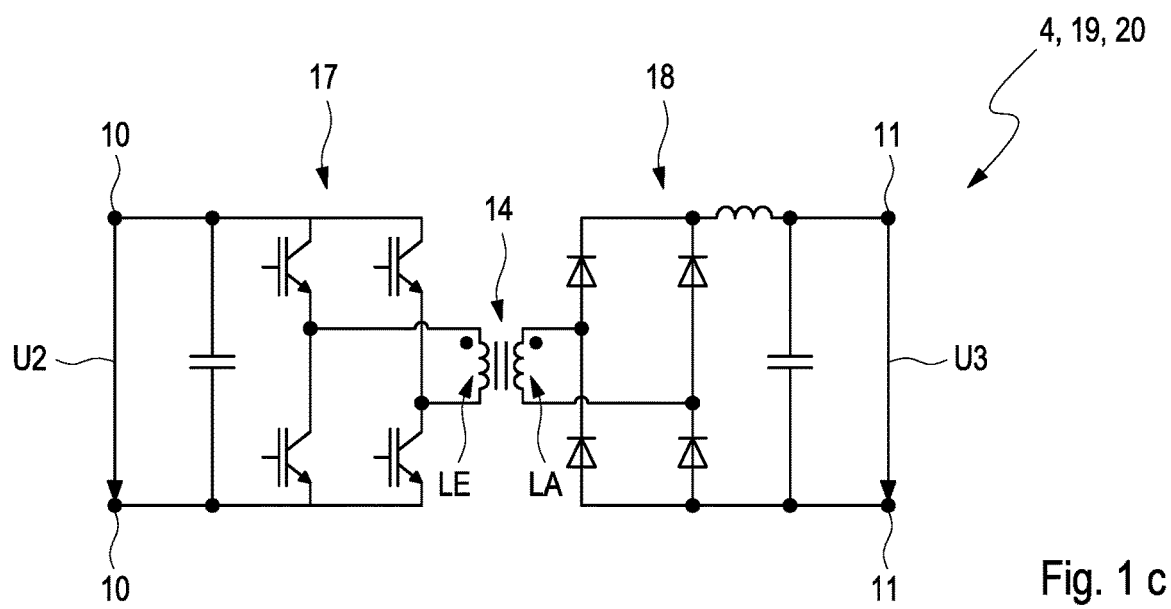

FIG. 1a shows a very schematic example of a fuel cell arrangement 2 according to the invention in a block diagram. The fuel cell arrangement 2 can be used for a motor vehicle. The fuel cell arrangement 2 includes a fuel cell 21 for generating an electrical fuel cell voltage U1. The fuel cell arrangement 2 also includes an electronic circuit arrangement 1 according to the invention, which is also illustrated by way of example in FIG. 1a.

The fuel cell 21 of the fuel cell arrangement is electrically connected to the electronic circuit arrangement 1 in order to supply the electronic circuit arrangement 1 with the electrical fuel cell voltage U1. The electrical fuel cell voltage U1 is an electrical direct voltage. An electrical load 22 and/or an electrical battery 23 can be supplied with the electrical fuel cell voltage U1 generated by the fuel cell 21 via the electronic circuit arrangement 1.

According to the example in FIG. 1a, the electronic circuit arrangement 1 for the fuel cell arrangement 2 comprises a first electrical voltage converter stage 3. The electrical fuel cell voltage U1 can be applied to the first electrical voltage converter stage 3 on the input side and is actually applied in the example shown. In this case, the electrical fuel cell voltage U1 can be converted into a first electrical output voltage U2 of the first electrical voltage converter stage 3 by means of the first electrical voltage converter stage 3.

The electronic circuit arrangement 1 also has a second electrical voltage converter stage 4 which is electrically connected to the first electrical voltage converter stage 3. The first electrical output voltage U2 of the first electrical voltage converter stage 3 can be applied to the second electrical voltage converter stage 4 on the input side and is actually applied in the example shown. In this case, the first electrical output voltage U2 can be converted into a second electrical output voltage U3 of the second electrical voltage converter stage 4 by means of the second electrical voltage converter stage 4. In addition, the electrical interconnection of the first and the second electrical voltage converter stage 3, 4 is designed to be switchable between a first interconnection state Z1—which is shown in FIG. 1a—and a second interconnection state Z2. An electrical input voltage Uin can be converted into an electrical output voltage Uout by means of the electronic circuit arrangement 1. The electrical input voltage Uin corresponds to the electrical fuel cell voltage U1. In the first interconnection state Z1 of the electronic circuit arrangement 1, the electrical output voltage Uout corresponds to the second output voltage U3. The electrical output voltage is, like the electrical input voltage, a direct voltage.

FIG. 1b shows an electrical circuit diagram of an example of the first electrical voltage converter stage 3. It can be seen that the first electrical voltage converter stage 3 can be switched between an inactive state and an active state by means of an electrical switch S. The switch S can be implemented as a mechanical switch or as a semiconductor switch, in particular as an electrical transistor—particularly preferably as a field effect transistor (FET)—or as an electrical thyristor. In this case, the first electrical output voltage U2 corresponds to the fuel cell voltage U1 in the inactive state of the first electrical voltage converter stage 3. In the active state of the first electrical voltage converter stage, the fuel cell voltage U1 is converted, in particular, increased, to the first electrical output voltage U2. The inactive state of the first electrical voltage converter stage 3 is the second interconnection state Z2 and the active state of the first electrical voltage converter stage 3 is the first interconnection state Z1.

FIG. 1b also shows that the first electrical voltage converter stage 3 is provided with a converter topology without galvanic isolation. In the example shown, the first electrical voltage converter stage 3 is a step-up converter 5. By means of the first electrical voltage converter stage 3, which is designed as a step-up converter 5, an electrical voltage value of the first output voltage U2 can be increased compared to an electrical voltage value of the fuel cell voltage U1 during the conversion. This means that the magnitude of the first output voltage U2 is greater than the fuel cell voltage U1. The topology of the step-up converter 5 is also known to the skilled in the art as a so-called boost topology.

FIG. 1c shows an example of an electrical circuit diagram of the second electrical voltage converter stage 4 for the example of FIG. 1a. It can be seen that the second voltage converter stage 4 is provided with a converter topology with galvanic isolation. In the example in FIG. 1c, the second electrical voltage converter stage 4 is a push-pull converter 19. In the example shown, the voltage converter stage 4 is in the form of a full-bridge forward converter 20.

Figure 2:
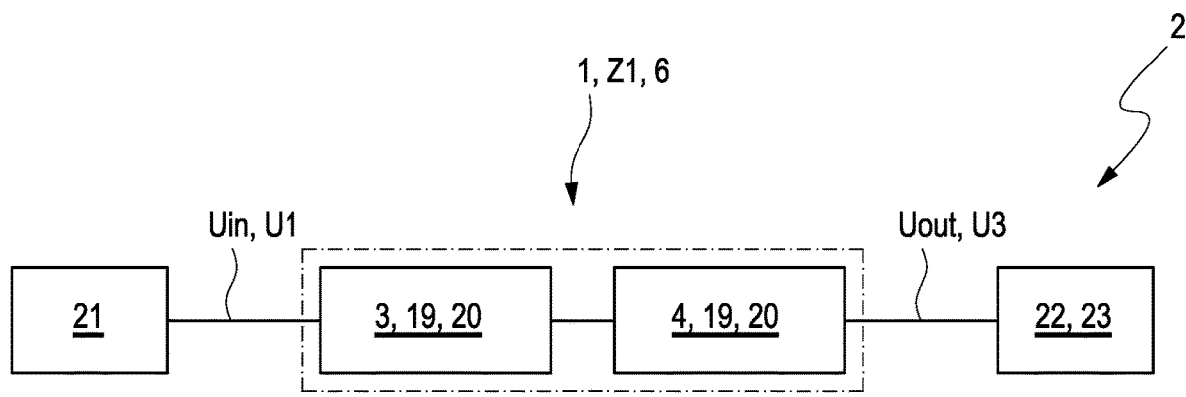
FIG. 2b shows the example of FIG. 2a in a second interconnection state.
Figure 2:
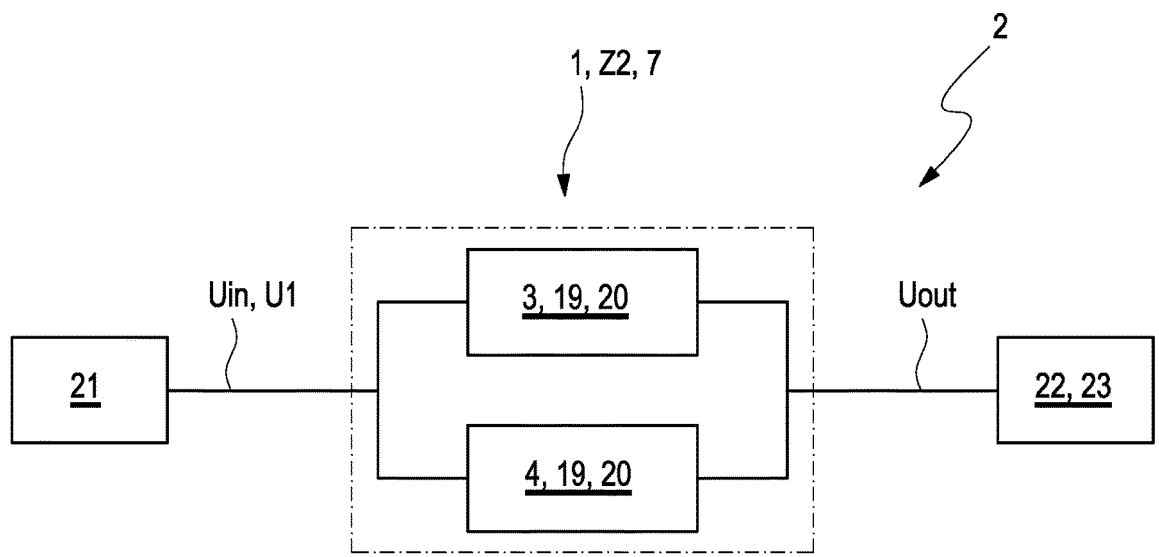

A further example according to the invention of a fuel cell arrangement 2 with an electronic circuit arrangement 1 according to the invention is shown in FIGS. 2a and 2b. FIG. 2a shows the first interconnection state Z1 of the electronic circuit arrangement 1 and FIG. 2b shows the second interconnection state Z2 of the electronic circuit arrangement 1. In the first interconnection state Z1, the first and the second voltage converter stage 3, 4 are connected in series. In contrast, in the second interconnection state Z2, the first and the second voltage converter stage 3, 4 are connected in an electrical parallel connection 7.

Figure 3:
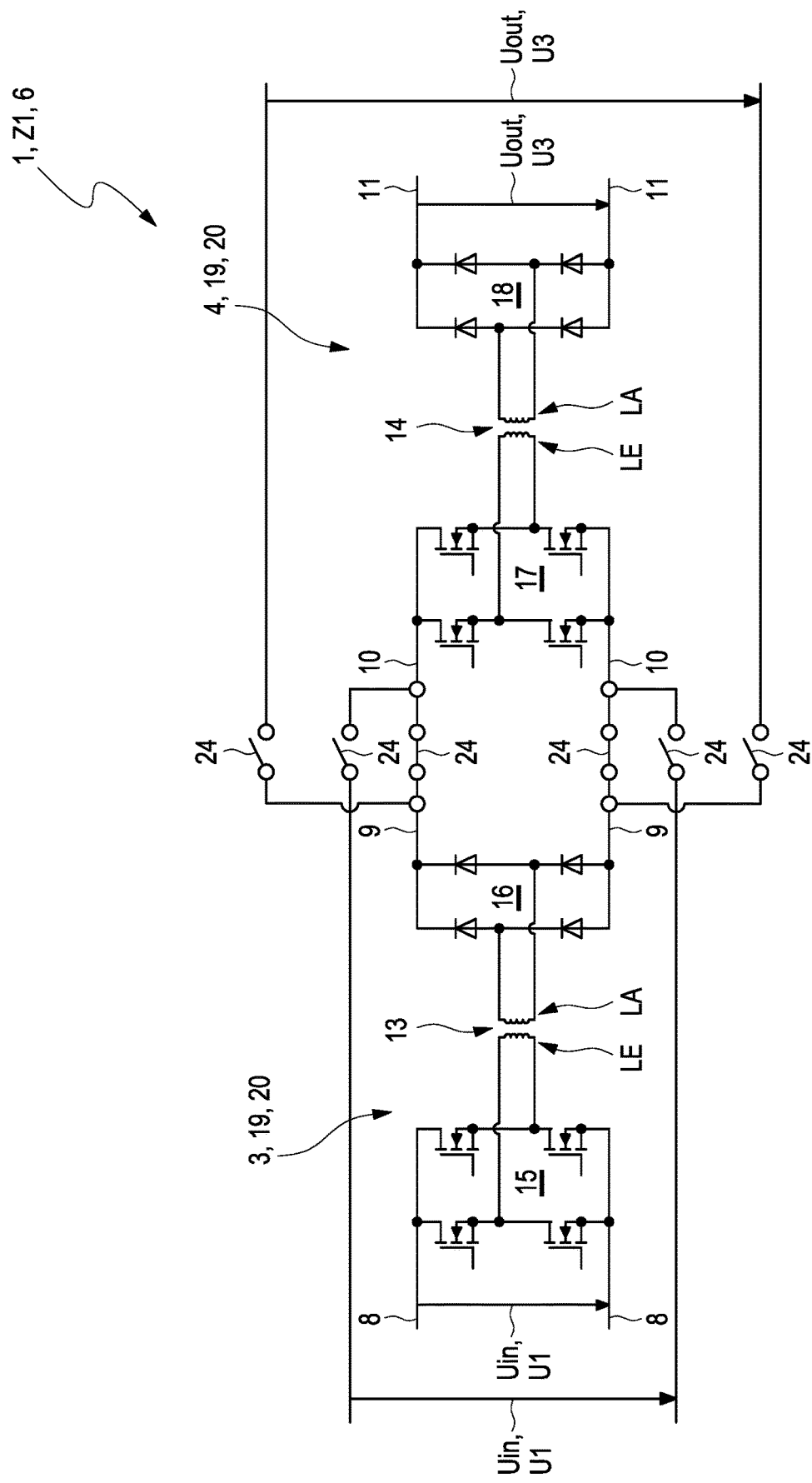
FIG. 3a shows an example an electrical circuit diagram of an electronic circuit arrangement according to the invention in a first interconnection state.
FIG. 3b shows the example of FIG. 3a in a second interconnection state.
Figure 3:
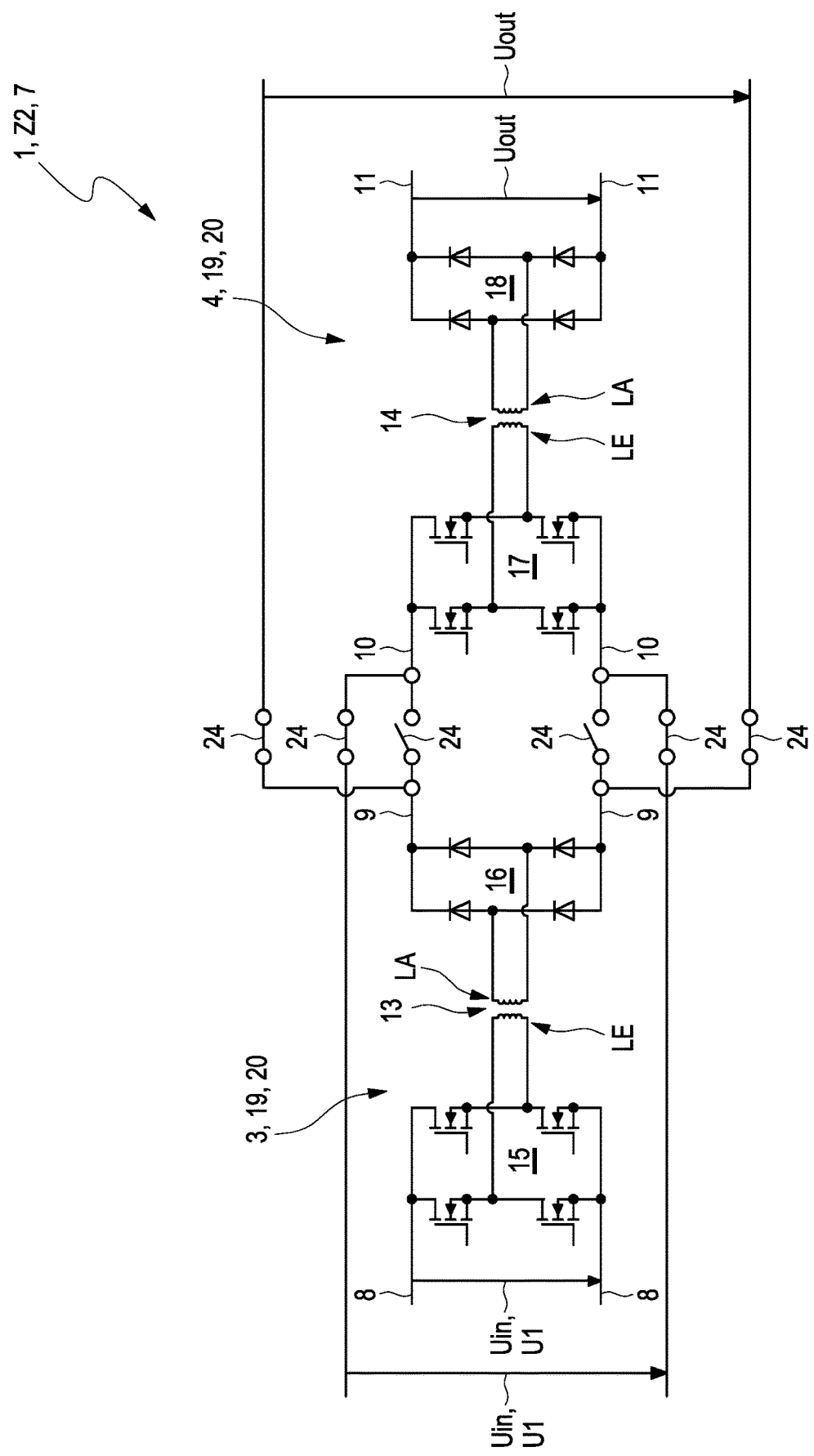

A further example of the electronic circuit arrangement 1 according to the invention is illustrated in FIGS. 3a and 3b by means of an electrical circuit diagram. FIG. 3a shows the electronic circuit arrangement 1 in the first interconnection state Z1 and FIG. 3b shows the electronic circuit arrangement 1 in the second interconnection state Z2. The switching between the interconnection states Z1, Z2 can take place by means of relays 24, which are accordingly set up. It can be seen that the first electrical voltage converter stage 3 has two first electrical voltage inputs 8 and two first electrical voltage outputs 9. The second electrical voltage converter stage 4 has two second electrical voltage inputs 10 and two second electrical voltage outputs 11. In the example shown, the first electrical voltage converter stage 3 includes a first electrical transformer 13. The first electrical transformer 13 of the first electrical voltage converter stage 3 includes an electrical input inductance LE and an electrical output inductance LA, which is galvanically isolated from the input inductance LE of the first transformer 13.

The second electrical voltage converter stage 4 includes a second electrical transformer 14. The second electrical transformer 14 also has an electrical input inductance LE and an electrical output inductance LA galvanically isolated from the input inductance LE of the second transformer. The input inductances LE and the output inductances LA of the first transformer 13 and of the second transformer 14, respectively, can be formed by electrical coils. The electrical input inductance LE of the first electrical transformer of the first electrical voltage converter stage 3 is or can be connected to the first electrical voltage inputs 8 of the first electrical voltage converter stage 3 via a first electrical switching device 15 of the first electrical voltage converter stage 3. The electrical switching device 15 can include one or more switching units—four in the example shown. Such switching units can each be designed as a semiconductor switch—advantageously as a transistor, particularly preferably as a field effect transistor. The electrical output inductance LA of the first electrical transformer 13 of the first electrical voltage converter stage 3 is electrically connected to the first electrical voltage outputs 9 of the first electrical voltage converter stage 3 via a first electrical rectifier 16 of the first electrical voltage converter stage 3.

The electrical input inductance LE of the second electrical transformer 14 of the second electrical voltage converter stage 4 is or can be electrically connected to the second electrical voltage inputs 10 of the second electrical voltage converter stage 4 via a second electrical switching device 17 of the second electrical voltage converter stage 4. The electrical output inductance LA of the second electrical transformer 14 of the second electrical voltage converter stage 4 is electrically connected to the second electrical voltage outputs 11 of the second electrical voltage converter stage 4 via a second electrical rectifier 18 of the second electrical voltage converter stage 4.

Figure 4:
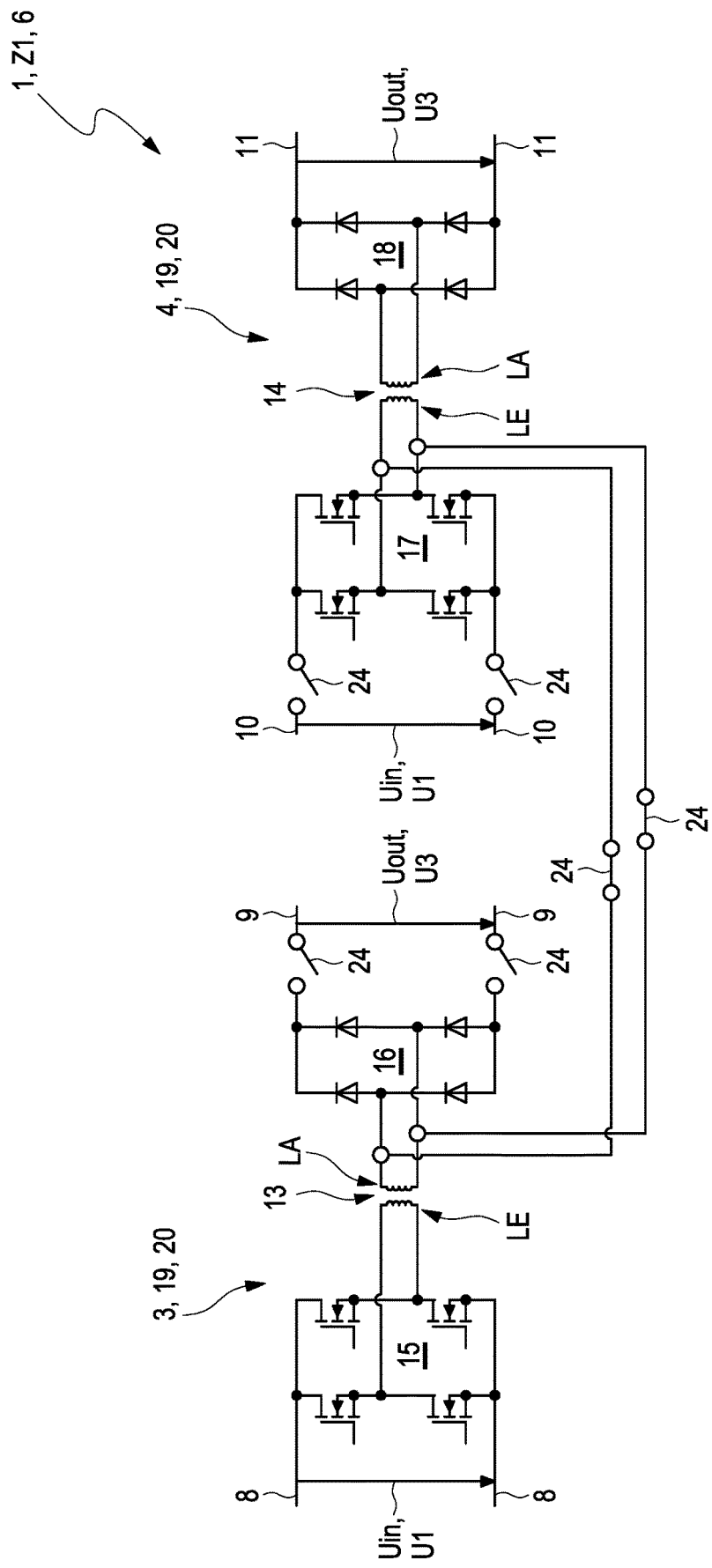
FIG. 4a shows an exemplary electrical circuit diagram of an electronic circuit arrangement according to the invention in a first interconnection state.
FIG. 4b shows the example of FIG. 4a in a second interconnection state.
Figure 4:
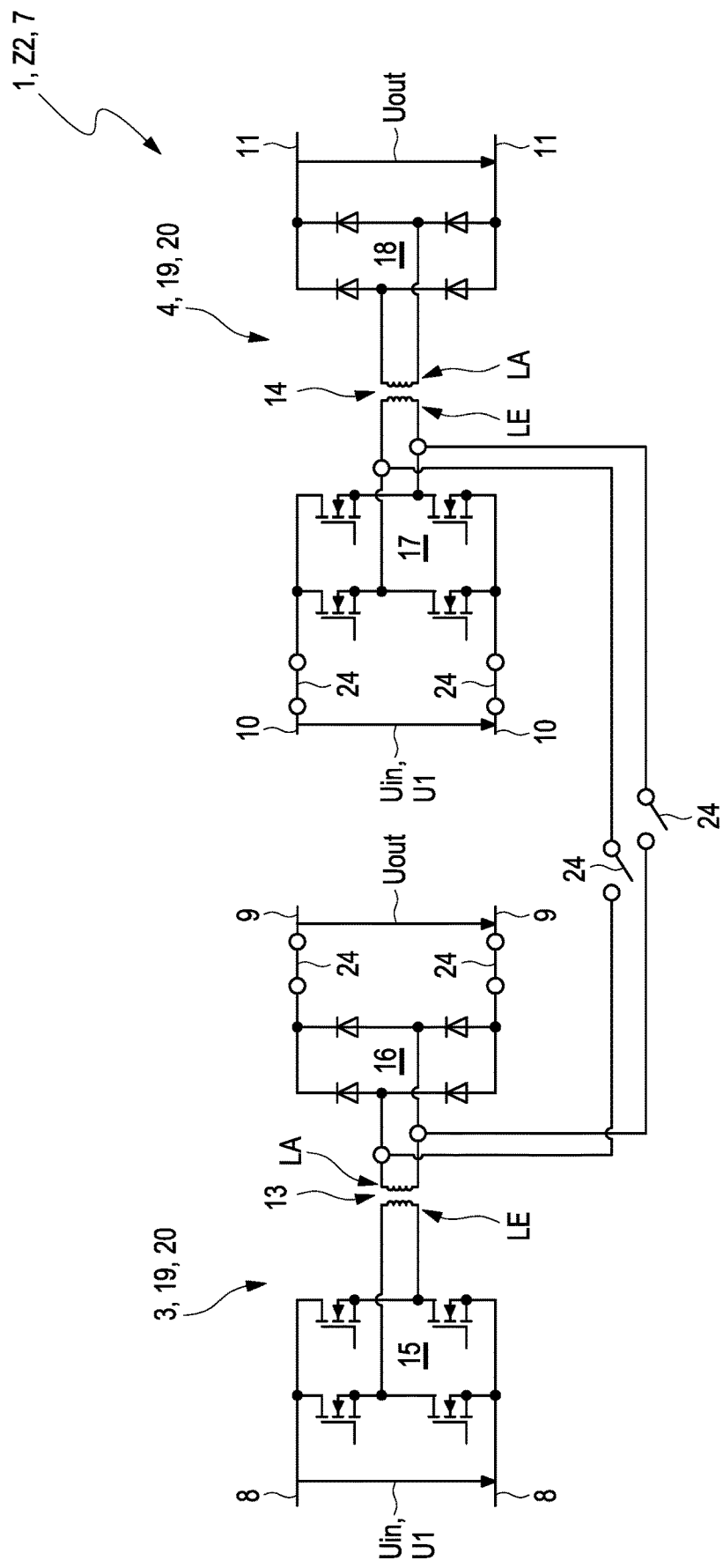

FIGS. 4a and 4b show electrical circuit diagrams of a further example of an electronic circuit arrangement 1 according to the invention. FIG. 4a illustrates the first interconnection state Z1 of the electronic circuit arrangement 1 and FIG. 4b shows the second interconnection state Z2 of the electronic circuit arrangement 1. It can be seen that, in the first interconnection state Z1 (cf. FIG. 4a), the electrical output inductance LA of the first electrical transformer 13 is connected to the electrical input inductance LE of the second electrical transformer 14 by electrically bypassing the second electrical switching device 17 and the first electrical rectifier 16.

In contrast to the example in FIGS. 4a and 4b, in the example in FIGS. 3a and 3b, in the first interconnection state Z1, one of the two first voltage outputs 9 of the first electrical voltage converter stage 3 is electrically connected to one of the two second voltage inputs 10 of the second electrical voltage converter stage 4. In the second interconnection state Z2, one of the two first voltage inputs 8 is electrically connected to one of the two second voltage inputs 10, respectively, and one of the two first voltage outputs 9 is electrically connected to one of the two second voltage outputs 11, respectively.

In the examples of FIGS. 2a, 2b, 3a, 3b and 4a and 4b, the first electrical voltage converter stage 3 is provided with a converter topology with galvanic isolation. In this case, the first electrical voltage converter stage 3 is designed as a push-pull converter 19. In said examples, the first electrical voltage converter stage 3 is designed as a full-bridge forward converter 20. The second electrical voltage converter stage 4 is designed in the same way as the first electrical voltage converter stage 4. It goes without saying that the two voltage converter stages 3, 4 can also be constructed with other voltage converter topologies without departing from the scope of the present invention.

The invention claimed is:

1. An electronic circuit arrangement for a fuel cell arrangement, comprising:

a first electrical voltage converter stage to which an electrical fuel cell voltage is appliable on an input side, the electrical fuel cell voltage convertible into a first electrical output voltage of the first electrical voltage converter stage via the first electrical voltage converter stage;

a second electrical voltage converter stage electrically connected to the first electrical voltage converter stage and to which the first electrical output voltage is appliable on an input side, the first electrical output voltage convertible into a second electrical output voltage of the second electrical voltage converter stage via the second electrical voltage converter stage; and wherein an electrical interconnection of the first electrical voltage converter stage and the second electrical voltage converter stage is configured to be switchable between a first interconnection state and a second interconnection state.

2. The electronic circuit arrangement of claim 1, wherein:

in the first interconnection state, the first electrical voltage converter stage is activated such that the first electrical output voltage is different than the electrical fuel cell voltage; and in the second interconnection state, the first electrical voltage converter stage is deactivated such that the first electrical output voltage corresponds to the electrical fuel cell voltage.

3. The electronic circuit arrangement of claim 1, wherein the first electrical voltage converter stage is provided with a converter topology without galvanic isolation.

4. The electronic circuit arrangement of claim 1, wherein the first electrical voltage converter stage is configured as a step-up converter via which, during the conversion, an electrical voltage value of the first electrical output voltage is increasable compared to an electrical voltage value of the electrical fuel cell voltage.

5. The electronic circuit arrangement of claim 1, wherein:

in the first interconnection state, the first electrical voltage converter stage and the second electrical voltage converter stage are connected in an electrical series connection; and in the second interconnection state, the first electrical voltage converter stage and the second electrical voltage converter stage are connected in an electrical parallel connection.

6. The electronic circuit arrangement of claim 5, wherein:

the first electrical voltage converter stage includes two first electrical voltage inputs and two first electrical voltage outputs; and the second electrical voltage converter stage includes two second electrical voltage inputs and two second electrical voltage outputs.

7. The electronic circuit arrangement of claim 6, wherein:

the first electrical voltage converter stage further includes a first electrical transformer with an electrical input inductance and an electrical output inductance, which is galvanically isolated from the electrical input inductance of the first electrical transformer;

the second electrical voltage converter stage further includes a second electrical transformer with an electrical input inductance and an electrical output inductance, which is galvanically isolated from the electrical input inductance of the second electrical transformer;

the electrical input inductance of the first electrical transformer is electrically connectable to the two first electrical voltage inputs via a first switching device;

the electrical output inductance of the first electrical transformer is electrically connected to the two first electrical voltage outputs via a first electrical rectifier;
the electrical input inductance of the second electrical transformer is electrically connectable to the two second electrical voltage inputs via a second switching device; and
the electrical output inductance of the second electrical transformer is electrically connected to the two second electrical voltage outputs via a second electrical rectifier.

8. The electronic circuit arrangement of claim 7, wherein, in the first interconnection state, the electrical output inductance of the first electrical transformer is connected to the electrical input inductance of the second electrical transformer via electrically bypassing the second switching device and the first rectifier.

9. The electronic circuit arrangement of claim 6, wherein, in the first interconnection state, one of the two first electrical voltage outputs is electrically connected to one of the two second electrical voltage inputs, respectively.

10. The electronic circuit arrangement of claim 6, wherein, in the second interconnection state, one of the two first electrical voltage inputs is electrically connected to one of the two second electrical voltage inputs, respectively, and one of the two first electrical voltage outputs is electrically connected to one of the two second electrical voltage outputs, respectively.

11. The electronic circuit arrangement of claim 5, wherein the first electrical voltage converter stage is provided with a converter topology with galvanic isolation.

12. The electronic circuit arrangement of claim 5, wherein the first electrical voltage converter stage is configured as a push-pull converter.

13. The electronic circuit arrangement of claim 1, wherein the second electrical voltage converter stage is provided with a converter topology with galvanic isolation.

14. The electronic circuit arrangement of claim 1, wherein the second electrical voltage converter stage is configured as a push-pull converter.

15. A fuel cell arrangement, comprising:
at least one fuel cell configured to provide an electrical fuel cell voltage;
an electronic circuit arrangement to which the at least one fuel cell is electrically connected for supplying the electronic circuit arrangement with the electrical fuel cell voltage;
wherein the electronic circuit arrangement includes:
a first electrical voltage converter stage to which the electrical fuel cell voltage is appliable on an input side, the electrical fuel cell voltage convertible into a first electrical output voltage of the first electrical voltage converter stage via the first electrical voltage converter stage; and
a second electrical voltage converter stage electrically connected to the first electrical voltage converter stage and to which the first electrical output voltage is appliable on an input side, the first electrical output voltage convertible into a second electrical output voltage of the second electrical voltage converter stage via the second electrical voltage converter stage;
wherein an electrical interconnection of the first electrical voltage converter stage and the second electrical voltage converter stage is configured to be switchable between a first interconnection state and a second interconnection state.

16. The fuel cell arrangement of claim 15, wherein:
in the first interconnection state, the first electrical voltage converter stage and the second electrical voltage converter stage are connected in an electrical series connection; and
in the second interconnection state, the first electrical voltage converter stage and the second electrical voltage converter stage are connected in an electrical parallel connection.

17. The fuel cell arrangement of claim 16, wherein:
the first electrical voltage converter stage includes two first electrical voltage inputs and two first electrical voltage outputs; and
the second electrical voltage converter stage includes two second electrical voltage inputs and two second electrical voltage outputs.

18. The fuel cell arrangement of claim 17, wherein:
the first electrical voltage converter stage further includes a first electrical transformer with an electrical input inductance and an electrical output inductance, which is galvanically isolated from the electrical input inductance of the first electrical transformer;
the second electrical voltage converter stage further includes a second electrical transformer with an electrical input inductance and an electrical output inductance, which is galvanically isolated from the electrical input inductance of the second electrical transformer;
the electrical input inductance of the first electrical transformer is electrically connectable to the two first electrical voltage inputs via a first switching device;
the electrical output inductance of the first electrical transformer is electrically connected to the two first electrical voltage outputs via a first electrical rectifier;
the electrical input inductance of the second electrical transformer is electrically connectable to the two second electrical voltage inputs via a second switching device; and
the electrical output inductance of the second electrical transformer is electrically connected to the two second electrical voltage outputs via a second electrical rectifier.

19. The fuel cell arrangement of claim 15, wherein the first electrical voltage converter stage is configured as a full-bridge forward converter.

20. The fuel cell arrangement of claim 15, wherein the second electrical voltage converter stage is configured as a full-bridge forward converter.

* * * * *